United States Patent [19]

Lee

[11] Patent Number: 5,746,904

[45] Date of Patent: May 5, 1998

[54] METHOD, APPARATUS AND SYSTEM FOR CONTINUOUSLY TREATING WATER BODY

[76] Inventor: Ming Shing Lee, 4th Floor, No. 5, Lane 146, Hsin-Sheng South Road, Section 1, Taipei, Taiwan

[21] Appl. No.: 610,882

[22] Filed: Mar. 5, 1996

[51] Int. Cl.$^6$ .................................................. G02F 1/461
[52] U.S. Cl. ........................... 205/757; 204/237; 204/269
[58] Field of Search .......................... 205/757; 204/269, 204/237

[56] References Cited

U.S. PATENT DOCUMENTS

| | | | |
|---|---|---|---|
| 3,926,754 | 12/1975 | Lee | 204/152 |
| 4,012,319 | 3/1977 | Ramirez | 205/757 |
| 4,036,726 | 7/1977 | Gale et al. | 204/231 |
| 4,123,339 | 10/1978 | Gale et al. | 204/149 |
| 4,123,345 | 10/1978 | Shettel | 205/757 |
| 4,919,775 | 4/1990 | Ishigaki | 205/757 |

FOREIGN PATENT DOCUMENTS 0 295 696  12/1988  European Pat. Off.
79100054  11/1990  Taiwan.

OTHER PUBLICATIONS

Lee in *Proc. 17th Conf. on Wastewater Treatment Technology*, pp. 647–660, published on Dec. 3 and 4, 1992 with English language Abstract.

*Primary Examiner*—Arun S. Phasge
*Attorney, Agent, or Firm*—Evenson, McKeown, Edwards & Lenahan, P.L.L.C.

[57] ABSTRACT

A method for continuously treating a water body, comprising a step of using a substantially sealed processing tank, at a top and a bottom portions of which a water outlet and a water inlet are arranged respectively, and in an interior space of which three or more conductive plates substantially in parallel relation with the tank bottom and substantially in parallel relation with one another for upwardly forming a substantially closed S-shaped one-way flow path in said processing tank, wherein said conductive plates are made of a conductive material having a resistivity ranged from 1.59 μΩ to 1300 μΩcm and at least two of said conductive plates are respectively electrically connected to a positive and a negative power source to serve as an anode and a cathode, wherein said water to be treated is introduced into said processing tank from said water inlet, flows upwardly through said S-shaped one-way flow path, and then is discharged out of said processing tank form said water outlet, and wherein a voltage is applied to said cathode and said anode to generate an electric field having an intensity ranged from 0.5 mV/cm to 1000 V/cm during the flow of said water body in said flow path, thereby polarizing and coagulating impurities in said water body to removing said coagulating impurities.

14 Claims, 4 Drawing Sheets

METHOD, APPARATUS AND SYSTEM FOR CONTINUOUSLY TREATING WATER BODY

FIELD OF THE INVENTION

The present invention is related to a method, an apparatus and a system for continuously treating a water body, and more particularly to a method, an apparatus and a system for continuously treating a water body by utilizing the polarization of an electric field to coagulate the impurities in the water body so that the impurities can be removed easily from the water body.

BACKGROUND OF THE INVENTION

Currently, the method generally used for treating sewage or industrial waste water include: 1. physical method; 2. chemical method; 3. biological method; and 4. electrochemical method, etc. Among these methods, the electrochemical method (electrolysis) has been well developed by those skilled in the art owing to its low space-occupancy, good economy-utility, and free of odor and secondary pollution. The patents related to this field include ROC Patent Application No. 79100054, U.S. Pat. Nos. 3,926,754, 4,036,726 and 4,123,339, and EP Patent No. 0295696. The prior art utilizes the chemical reaction occurring in a closed electrolytic tank during the electrolysis operation to change the properties of the sewage or water waste. The continuous outflow from the electrolytic tank is then treated to have the impurities therein removed so that the discharged water is cleansed to a great extent.

Figure 1:
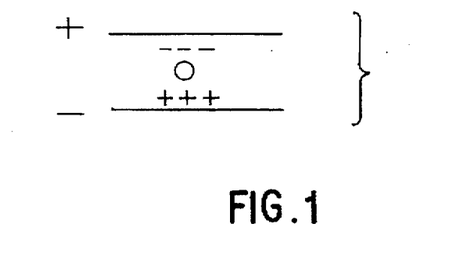
FIG. 1 is a schematic diagram showing the polarization function of electric field.

When an electrochemical procedure is executed, six basic functions occur simultaneously between the two electrodes and in the electrolytic solution:

1. oxidation: Electrons are provided for the anode to oxidize the impurities in the solution;
2. reduction: Electrons are provided by the cathode to reduce the impurities in the solution;
3. electrophoresis: Ions with positive charge(s) moves from the anode to the cathode; while ions with negative charge (s) moves from the cathode to the anode;
4. electroetching: If the anode is made of a cheap metal, the anode is subject to oxidization-mode ionization to release cations by applying suitable voltage between the two electrodes to make the solution have proper conductivity.
5. electrolysis: Water is decomposed into hydrogen and oxygen.
6. polarization: Impurities and water molecules are polarized in response to the application of the electric field formed between the two electrodes when suitable voltage is applied so that the ions with negative charge(s) gather near the anode and the ions with positive charge(s) gather near the cathode, as shown in FIG. 1.

The prior art generally utilizes the former five of the above six functions to electrochemically treating waste water, and concentrates on a specific function but inhibits the other ones to result in the most efficient performance and the most advantageous effect. For example, a conventional electrolyzed colloid floating-and-removing method uses a material composed of iron and aluminum as a sacrificial anode. The metal ions released from the anode form a colloid with high molecular weight by coagulating with microgel in the water body, followed by forming a gas-solid phase complex by combining with the hydrogen bubble released from the cathode, and then the complex is floated and removed. Although this method works for removing suspension solid and micro-particles, there still exist several defects of:

1. large electricity-consumption and long treatment-time;

A research report proposed by Lee in *Proc. 17th Conf. on Wastewater Treatment Technology*, pp. 647–660, disclosed that when the sewage discharged from the hog-breeding is treated with an electrolytic coagulation method, the electrolysis period for obtaining a satisfying water quality is about 30 minutes, and the specific energy-consumption for continuous treatment is up to 18 kwh/kg-COD. It is also reported by Yan that the specific energy-consumption is 1.17 kwh/kg-COD when acidified fatty waste-water is treated in an electrolyzed colloid floating-and-removing tank in a continuous mode.

2. complicated structure and inconvenient maintenance of the equipment;

The cathode and anode plates have to be frequently changed owing to the etching of the electrode plates occurring during the electrolysis process. In addition, the electrode plates are interleavingly and repetitively arranged and each of the electrode plates is connected to a power supply so that it is inconvenient to execute the change of the electrode plates. Furthermore, contaminants are subject to depositing on the cathode plates, so a scraper is needed for scraping the deposited contaminants. The installation of the scraper makes the construction of the electrolytic tank more complicated and makes the change of the electrode plates more difficult.

The present invention is developed for resolving the defects of the prior art. It is found that the utilization of the polarization function, i.e. the sixth function mentioned above, can make the impurity molecules coagulate in a very short time to achieve the purpose of water cleansing. The present invention is free of the defects of long time-consumption, large energy-consumption and inconvenient maintenance existing in the prior art.

OBJECTIVES OF THE PRESENT INVENTION

An objective of the present invention is to provide a method for continuously treating a water body in which the impurities coagulate and float to be easily removed by utilizing a polarization function in response to electric field and an energy-exchange function.

Another objective of the present invention is to provide an apparatus for continuously treating water body, wherein the structure of the apparatus is simplified compared to that of the prior art and the consumptive components of the apparatus are easy to be changed.

A further objective of the present invention is to provide a system for continuously treating water body in a high efficiency, economical electricity and easy maintenance mode.

These and other objectives of the present invention will be more clearly understood from the following detailed description and appended claims.

DETAILED DESCRIPTION OF PREFERRED EMBODIMENTS

The present invention widely studies on the electrochemical treatment on waste water. It is suprisingly found that when several conducting plates are arranged between the cathode and the anode, and the electrodes and the conducting plates are arranged to form an upward closed S-shaped one-way flow path, the impurities in the water coagulate to form a cluster in a very short time, e.g. 1 minute, if an electric field having a sufficient intensity is generated between the two electrodes by the application of a proper voltage to the cathode and the anode. The phenomenon of rapid coagulation in a very short time cannot be explained by the conventional electrolytic coagulation principle.

The present inventors repetitively make experiments on and analyze the phenomenon. The possible reason for the occurrence of the phenomenon is inferred as follows.

When a proper voltage is applied to the cathode and the anode so that an electric field having a sufficient intensity is generated between the electrodes, the impurity and the water molecules in the solution are polarized under the electric field, i.e. the end adjacent the anode bears negative charges while the other end adjacent the cathode bears positive charges, as shown in FIG. 1.

The polarization function makes the impurities such as the solution molecules and solid micro-bubble in the water body polarized to become particles alternately bearing positive and negative charges. In addition, all of the particles bearing mutually repulsive charges or no charge become those bearing mutually attractive charges, and thereby the coagulation phenomenon occurs.

The conductive plates arranged between the anode and the cathode facilitate the coagulation of the impurity particles, but the mechanism still remains unknown. It is inferred that the mechanism may have relations with the energy transfer enhanced by the generation of a micro electric field on the conductive plates themselves. After the impurities are induced to bear bipolar charges to conduct mutually attractive effect and further coagulation effect, other effects are still required to make the dispersive small impurities collide with one another to form a bigger cluster which can be separated from the water body more easily than a small one. The collision among the impurities can be achieved by the following ways:

1) Macroscopic agitation:

The impurities can collide with one another in the water body through mechanical agitation. The conductive plates in the processing tank can be arranged to be an S-shaped path so that the water body can perform invertedly flow under an electric field to achieve the effect of mechanical agitation.

Figure 2:
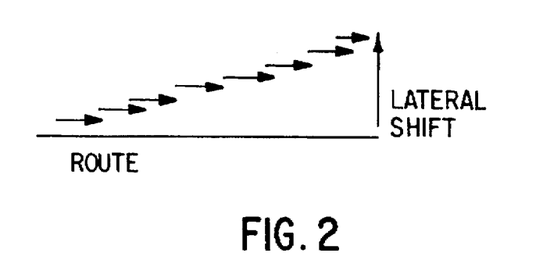
FIG. 2 is a schematic diagram showing the horizontal shift of the impurities with a microscopic turbulent phenomenon.

2) Microscopic turbulence:

The dimensions of some of the impurities are very small, even as small as a molecule or an ion state. The mechanical agitation can only make the impurities macroscopically shifted, and the distance between the small impurities still remain unchanged. In other words, the impurity molecules will not mutually collide to combine into a cluster. In order to overcome this problem, the present invention has the impurities induced to bear charges, and then accelerates the charges to form a unidirectional current to further generate a magnetic field perpendicular to the flow direction. Because each of the separated impurities forms therearound its own independent magnetic field, the interaction between these magnetic fields forces the impurities to slightly laterally shift along the direction of the magnetic field, and the small lateral shift will become a larger lateral shift after a journey. Different impurities bear different charges so that form therearound different intensities of magnetic field. Therefore, the lateral shifts of the impurities will also be different so that the collision between the impurities are possible. The lateral shift state of the impurities is shown in FIG. 2. When a water body is kept moving in an S-shaped flow path, the impurities will be accelerated to achieve the spontaneous shift.

On the basis of the above observations, a method for continuously treating a water body is disclosed in the present application. The present method includes a step of using a substantially sealed processing tank, at a top and a bottom portions of which a water outlet and a water inlet are arranged respectively, and in an interior space of which three or more conductive plates substantially in parallel relation with the tank bottom and substantially in parallel relation with one another for upwardly forming a substantially closed S-shaped one-way flow path in the processing tank, wherein the conductive plates are made of a conductive material having a resistivity ranged from 1.59 µΩcm to 1300 µΩcm and at least two of the conductive plates are respectively electrically connected to a positive and a negative power source to serve as an anode and a cathode, wherein the water to be treated is introduced into the processing tank from the water inlet, flows upwardly through the S-shaped one-way flow path, and then is discharged out of the processing tank form the water outlet, and wherein a voltage is applied to the cathode and the anode to generate an electric field having an intensity ranged from 0.5 mV/cm to 1000 V/cm during the flow of the water body in the flow path, thereby polarizing and coagulating impurities in the water body to removing the coagulating impurities.

The water body suitable for being treated according to the present invention may be any kind of industrial waste water and contaminated water body, for example the litter-infiltrating water, river sewage, dyeing waste water, electroplating waste water, pulping waste water, petroleum chemical waste water, automobile-maintenance waste water, fermentation waste water, waste water from ice cream factory, restaurant waste water, hospital waste water, lab waste water and living waste water, etc.

The present invention is not limited to be used for treating water bodies having specific pH values, conductivities, temperatures, impurity species and impurity concentrations. The water body to be treated can be acidic, neutral or basic, i.e. any water body having a pH value ranged within 0~14 can be treated according to the present method. Any water body having a conductivity ranged between 0.98 µs/cm to 254 ms/cm (equivalent to that of the concentration of super-pure water to saturated sodium chloride) is suitable for being treated according to the present invention. As for the impurity concentration, the impurities can be directly treated if the concentration thereof is ranged from 0 to $10^5$ ppm, while another water resource recovery step had better be executed prior to the present method if the concentration thereof is higher than $10^5$ ppm.

In accordance with the present invention, the water outlet and the water inlet are respectively arranged at the top and the bottom portions of the processing tank. The conductive plates in the processing tank are arranged substantially in parallel relation with the tank bottom and substantially in parallel relation with one another for upwardly forming a substantially closed S-shaped one-way flow path. The installation of the S-shaped flow path causes the inverted flow of the water body to achieve the purpose of mechanical agitation. It is to be noted that the conductive plates should not be arranged to be perpendicular to the tank bottom to form a rightward shape or waveform shape because the hydrogen and the oxygen bubbles generated owing to the electrolysis of water are likely to accumulate at the peak of the waveform to hinder the flow of the water body.

At least two of the conductive plates are connected to the positive and the negative power supply, respectively, to serve as an anode and a cathode. It can also be chosen to arrange a plurality pairs of cathode and anode which are alternately arranged. The number of the conductive plates which are not connected with power supply is dependent on practical requirement. The number of the conductive plates which are not connected with power supply between each pair of cathode and anode can be identical or different. The existence of the unplugged conductive plates is for improving the coagulation of the impurity particles. However, the action mechanism is still unknown. It is inferred that it may have relation with the improved energy transfer resulting from the generation of micro-electric field on the conductive plates themselves.

The conductive plates including those connect to the power supply to serve as anode and cathode may be made of any conventional conductive material, and preferably, made of a conductive material having a resistivity ranged from 1.59 μΩcm to 1300 μΩcm. The examples of the conductive material include metals such as Fe, Al, Ag, Cu, Au, Zn, Cd, Pt, Sn, Cr, Sb, Ti and A, etc., alloys such as azurite, chalcopyrite, stainless steel, alferon and chromel, and non-metals such as graphite.

According to the present invention, a voltage is applied to the cathode and the anode to form an electric field having an intensity ranged from 0.5 mV/cm to 1000 V/cm between the electrodes, and thereby the impurities in the water body are readily polarized and then coagulate. The preferred electric field intensity is ranged from 0.1 V/cm to 1000 V/cm. Under the electric field, the electrolysis of water molecules are likely to occur. The hydrogen and the oxygen bubbles generated during the electrolysis of water molecules will combine with the impurities to facilitate the floating of the impurities and further facilitate the removal of the impurities.

According to the present invention, the flow rate of the water body through the S-shaped flow path is generally from 0.1 m/sec to 3.87 m/sec. The present invention increases the opportunity of collision between impurities polarized by the electric field by the special arrangement of the conductive plate in the processing tank, and thus the impurities can coagulate to form a cluster in a very short time. The residence time of the water body to be treated in the processing tank is generally less than 1 minute, which is much less than the residence time (about 30 minutes) in the conventional electrolyzed colloid floating-and-removing method. Therefore, the present invention consumes little electric energy. The electric energy consumed in the present method is 1% to 0.1% of that of the conventional electrolyzed colloid floating-and-removing method.

The present invention does not specifically require the temperature and the pressure of the water body, as long as the water body is in a liquid state.

Further, the present inventor found that the coagulating impurities caused by the polarization function induced by the electric field rapidly float to the water surface if the pH value of the water body is adjusted to a specific value immediately after the water body passes the electrochemical processing tank. On the contrary, the floating phenomenon of the coagulating impurities will not occur if the pH value of the water body is adjusted after a long-term stand.

The actual reason for the above phenomenon is not fully understood, but it is believed that it may have relations with energy transfer. In other words, when the water body passes an electric field, the water molecules absorbs the energy of the electric field to become an excited state. Under a condition of a proper pH value, the molecules instantaneously release energy to vaporize a portion of water which float to the water surface together with the impurities. If the water body treated in the electric field stands for a long time, the energy will be progressively released in a heat form. The adjustment of the pH value at this time will have no sufficient energy to vaporize the water molecules, so the impurities will descend instead of floating.

The floating of the coagulating impurities makes the impurities removed more easily. Therefore, in a preferred embodiment of the present invention, the present method further includes a step of adjusting the pH value of the water body to a suitable value immediately after the water body passes the electrochemical processing tank in order to facilitate the floating and the removing of the impurities. The suitable pH value depends principally on the impurity species in the water body to be treated. Those skilled in the art can determine the suitable pH value without difficulty according to some trial results.

Furthermore, a coagulant and a stabilizer may be added to the electrochemically treated water body when necessary to facilitate the coagulation of the impurities to form a bigger cluster which is even easier to be removed. The coagulating impurities in the electrochemically treated water body are generally removed by a floating remover.

The present invention also provides an apparatus for continuously treating a water body which includes a substantially sealed processing tank, at a top and a bottom portions of which a water outlet and a water inlet are arranged respectively, and in an interior space of which three or more conductive plates substantially in parallel relation with the tank bottom and substantially in parallel relation with one another for upwardly forming a substantially closed S-shaped one-way flow path in the processing tank, wherein the conductive plates are made of a conductive material having a resistivity ranged from 1.59 μΩcm to 1300 μΩcm and at least two of the conductive plates are respectively electrically connected to a positive and a negative power source to serve as an anode and a cathode.

The present invention also provides a system for continuously treating a water body which includes a pretreating device for adjusting the pH value, conductivity and added catalyst of a water body to be treated for improving the effect of the following electrochemical treatment; an electrochemical device connected with the pretreating device for facilitating coagulation of impurities in the water body and providing energy for the impurities for easily separating the impurities from the water body; a post-treating device connected with the electrochemical device for adjusting the pH value of the electrochemically treated water body and adding a coagulant and stabilizer to the electrochemical device when necessary; a floating remover connected to the post-treating device for separating impurities from water; the system being characterized in that the electrochemical device includes a substantially sealed processing tank, wherein at a top and a bottom portions of the processing tank, a water outlet and a water inlet are arranged respectively, and in an interior space of the processing tank, three or more conductive plates substantially in parallel relation with the tank bottom and substantially in parallel relation with one another for upwardly forming a substantially closed S-shaped one-way flow path in the processing tank, wherein the conductive plates are made of a conductive material having a resistivity ranged from 1.59 μΩcm to 1300 μΩcm and at least two of the conductive plates are respectively electrically connected to a positive and a negative power source to serve as an anode and a cathode.

Preferred embodiments of the present apparatus and the present system will now be clearly illustrated with reference to the accompanying drawings.

Figure 3:
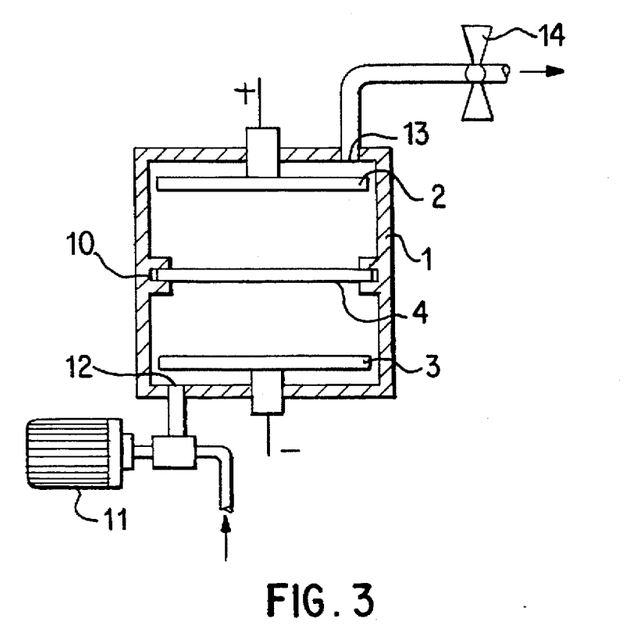
FIG. 3 is a front cross-sectional view of a first preferred embodiment of the present apparatus.
Figure 4:
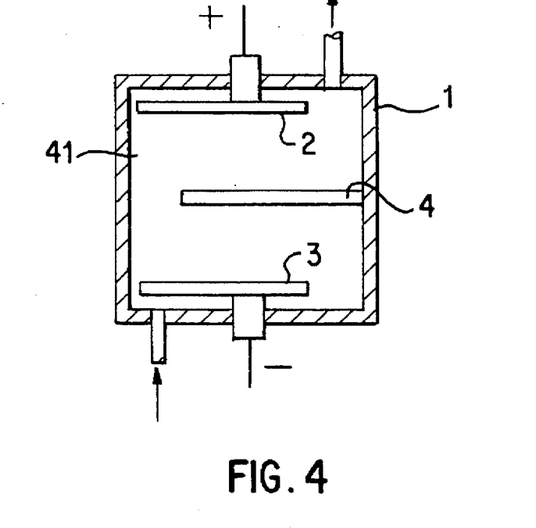
FIG. 4 is a side cross-sectional view of the first preferred embodiment of the present apparatus.

FIGS. 3 and 4 are cross-sectional front and side views of a first preferred embodiment of the present apparatus. The apparatus includes a processing tank 1 which is a sealed tank and one end surface of the tank is an openable tank door (installed on the front view of FIG. 1 but not shown). Recessed sliding ways 10 are mounted on both sides of the tank 1. The tank 1 also includes a pressurizing pump 11 connected to a water inlet 12 communicating with the tank bottom. A water outlet 13 is arranged at the top portion of the tank 1 and mounted thereat a flow control valve 14. An anode plate 2 is installed on the interior top portion of the tank 1 and externally connected to a power cable. A cathode plate 3 is mounted in the interior bottom portion of the tank 1 and externally connected to the power cable. A conductive plate 4 mounted in a space between the anode plate 2 and the cathode plate 3, which the treated solution will pass through. The conductive plate is secured by placing two sides of the plate into the slide ways 10, as shown in FIG. 4. The conductive plate 4 does not occupy all of the planes, and in stead, a vacancy 41 is left for the flowing therethrough of the treated solution. When a voltage is applied to the cathode and the anode to generate an electric field, the conductive plate 4 will enhance the electrochemical function of the electric field to facilitate the coagulation of the impurity particles.

Figure 5:
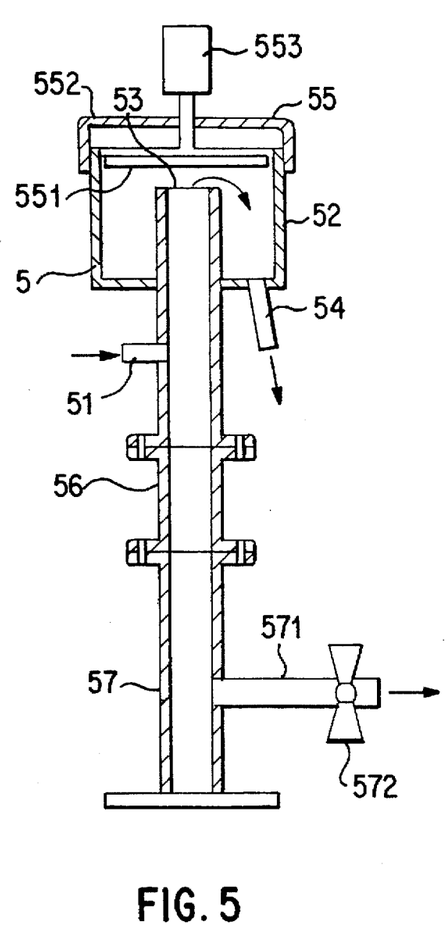
FIG. 5 is a cross-sectional view of the floating remover.

FIG. 5 shows a cross-sectional view of a floating remover. The water body treated with the electrochemical processing tank can be isolated by a floating remover.

The remover includes an upper section cylinder 5 in which a water inlet 51 is arranged on the cylinder body and connected with the water outlet of the processing tank, and an overflow collection vessel 52 is arranged on the upper portion of the cylinder in a way that an opening 53 on the upper section cylinder 5 communicates with the overflow collection vessel 52. The overflow collection vessel 52 is additionally arranged thereon a discharge tube 54 on which a scraping device 55 including a scraper 551 which is driven by a motor 553 and a cover 552 covering the overflow collection vessel 52 are mounted. An extension cylinder 56 may be connected below the upper section cylinder 5 and the cylinder body thereof may be locally transparent. A base cylinder 57 is connected below the extension cylinder 56 or connected directly below the upper section cylinder 5 when no extension cylinder 56 is needed. The cylinder body of the base cylinder 57 can also be locally transparent. The discharge tube 571 of the base cylinder 57 is also mounted thereon a flow control valve 572. The upper section cylinder 5, the extension cylinder 56 and the base cylinder 57 combine to form a floating remover tank.

Figure 6:
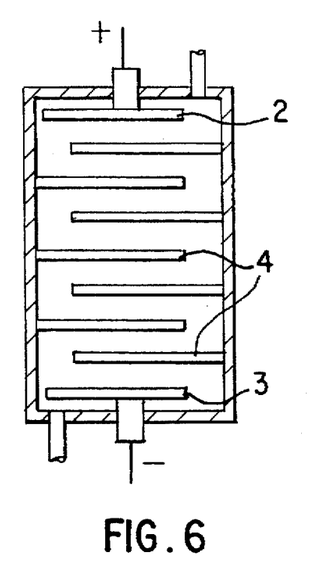
FIG. 6 is a side cross-sectional view of a second preferred embodiment of the present apparatus.

FIG. 6 is a cross-sectional side view of a second preferred embodiment of the present apparatus. The apparatus is characterized in that a plurality of conductive plates 4 is disposed between the anode plate and the cathode plate to achieve better performance. The conductive plates are disposed in the processing tank to form a substantially closed S-shaped one-way flow path. In a condition that the untreated water body keeps in a flowable liquid state, the untreated water is introduced from the bottom of the tank and flows out of the top of the processing tank through the substantially S-shaped one-way flow path. A predetermined voltage is applied to the anode and the cathode to generate an electric field having a predetermined intensity in a space between the cathode and the anode. The electric field results in the polarization of the impurities in the untreated water, renders the impurities absorbs energy, and induces the catalytic effect of the conductive plates to enhance the coagulation of the impurity particles. On the other hand, the untreated water flows through the closed S-shaped flow path with mechanical and magnetic agitation to make the impurities coagulate into a cluster to be isolated from the liquid.

According to the above disclosed apparatus, the operating procedures of the present invention can be summarized as follows:

1) The untreated water body is continuously pumped into the processing tank 1 by a pressurizing pump 11, and the pressure of the water body in the processing tank 1 is well controlled by the flow control valve 14.

2) A proper circuit may be used when necessary to alternately exchange the polarities of the electrodes. The alternate polarity-exchange cycle should be controlled within a proper range by setting a timing clock in the circuit.

3) Open the power and treat the water body. The needed time for efficiently treating the water body is very short according to the experimental results.

4) Introduce the water body discharged from the processing tank into the floating remover. When the suspension is sufficiently separated from the water, open the flow control valve 572 to drain the water body. The discharge rate of the water body should be controlled to have the suspension drained from the upper overflow collection vessel.

5) the overflow suspension can be further treated with an instrument such as a filter or a mud spin.

Therefore, by controlling the outflow rate of water with a flow control valve 14 mounted at the water outlet of the processing tank and controlling the outflow rate of the water with the valve 572 mounted at the water outlet of the floating remover to make the floating-and-removing rate and the discharging rate in equilibrium, the purpose of continuous floating-and removing operation can be achieved.

Figure 7:
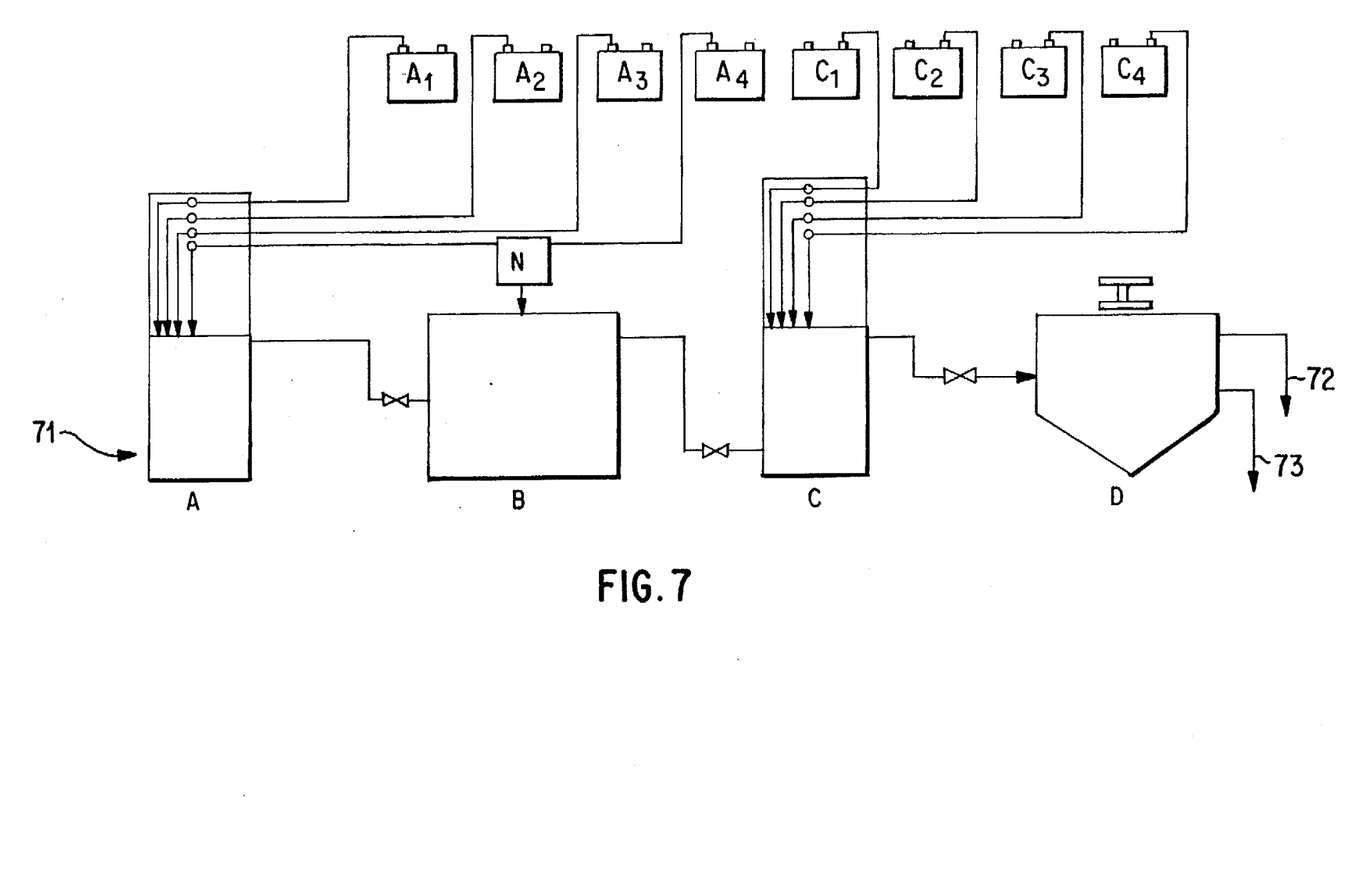
FIG. 7 shows a preferred embodiment of the present system.

FIG. 7 is a schematic view showing a preferred embodiment of the present system. The water body to be treated 71 sequentially passes a pretreating device A, a electrochemical device B, a post-treating device C and a floating remover D to become a cleansed dischargable water. The reference numeral 73 represents mud. The pretreating device A includes a conductive agent tank A1, a catalyst tank A2, an acid tank A3 and a base tank A4, and the water body is adjusted to a proper pH value and conductivity here to make the following electrochemical treatment perform well. The electrochemical device B is connected to a power supply N, and the internal structure thereof is shown in FIG. 6. The electrochemical device B may enlarge the size of the impurity particles and provide energy for the impurities to make the impurity easily isolated from the water. The post-treating device C includes a coagulant tank C1, a stabilizer tank C2, an acid tank C3 and a base tank C4 for adjusting the water properties before the impurities are floatingly removed. The floating remover D utilizes the energy absorbed by the impurities and the additional bubbles applied when necessary to readily separate the impurities from the water.

The present invention will now be further described according to the following examples. In these examples, unless specially designated, the term conductive plate(s) * refers to the conductive plate(s) which is not connected to a power supply, and the conductive plate(s) connected with a power supply is called electrode plates *

Embodiments

Embodiment 1 Experiment on latex 1) water body to be experimented: Natural latex is added into pure water with a concentration of 1000 mg/l. The pH value is adjusted to about 2 with sulfuric acid. The conductivity is adjusted to 800 μs/cm with NaCl solution. The COD value of the water body is about 1000 mg/l~1500 mg/l, the visibility<5 cm, and the temperature is 20°–30° C.

2) experimental instruments:

power supply: DC power supply with voltage output of 500 V and current output of 30 A reaction tank: two electrode plates and eight conductive plates parallelly spaced and in parallel to the ground, each of which has the same dimensions of 3.5 cm in width×13 cm in length×0.2 cm in thick, wherein the distance between the electrode plates is 10.6 cm and the eight conductive plates are arranged between the electrode plates in equal space, wherein the electrode plates and the conductive plates are made of iron, and wherein the anode of the power supply is connected to the upper electrode plate while the cathode of the power supply is connected to the lower electrode plate ( or the cathode of the power supply is connected to the upper electrode plate while the anode of the power supply is connected to the lower electrode plate). The reaction tank is enclosed with a closed vessel to make the water body flow upwardly to form an S-shaped flow path.

pump and motor: the water body of 1 cc~1000 cc/min can be continuously and adjustablly pumped thereby.

3) experimental procedures: Introduce the water body upwardly through a space between the electrode plates and the conductive plates in an S-shaped path. Open the power supply to set a voltage value to adjust the electric field. Disregard the treated water collected during the first five minutes because the apparatus is in a warm-up state. Sample the treated water which is obtained in a steady state.

4) operational conditions: electric field intensity: 3 V/cm pressure: normal pressure flow rate: 455 cc/min pressure inside the tank: <2 kg/cm$^2$ temperature: 25° C.

5) experimental results: the water body is in a turbid state, and the pH value thereof is about 4~5. The water body is placed into a vessel and stands for a while, and the water body is found to move upward and downward. When NaOH solution is used for adjusting the pH value to about 8.0, the impurities in the water body rapidly coagulate into a cluster in one minute and float up to the water surface, and the water under is transparent and clear. The clear water is sampled for COD analysis, and the result shows that the COD value is less than 200 mg/l. The clear water is sampled for visibility analysis and the result shows that the visibility is greater than 30 cm. If the adjustment of the pH value to about 8.0 is executed after the water body have stood for thirty minutes, the impurities descend.

Embodiment 2

The present invention shows the effects of electric intensity, flow rate of the water body, conductivity, pH value, temperature and pressure, and material and combination of the electrode and conductive plates on the water treatment.

Formulation of the water body to be experimented 1. materials:
1) super-pure water: the super-pure water used in semiconductor industry and having a conductivity less that 1 μs/cm
2) electrolyte: NaCl, 99.9%
3) acidifying reagent: H$_2$SO$_4$, 99.9%
4) basifying reagent: NaOH, 99.9%
5) impurities A: ink, brand: Wu-Chu Ink by Nen-Yi Enterprise, Ltd.
6) impurities B: No. 36 Chrome Yellow Poster Colors, brand: OSAMA
7) impurities C: silicon powder which is the ground powder of semiconductor wafer and has a particle size less than 1 μm formulating procedure:
1) measure a curtain amount of super-pure water and pour the measured water into a clean container;
2) measure a proper amount of impurities and add the impurities to the water;
3) add H$_2$SO$_4$ or NaOH to the water to adjust pH value;
4) add NaCl to the water to adjust conductivity;
5) filter the resulting water with No. 5 filter paper, and the visibility of the filtrate is less than 5 cm.

3. The water property indicator (visibility):

The indicator showing the quantity of the impurities in the water body can be impurity concentration, suspensive solid concentration, turbidity, color, COD, BOD, visibility, etc. This experiment uses visibility as the indicator of water properties for the sake of easy comparison and description. The unit is centimeter.

4. Numerals and Properties of water samples to be treated

TABLE 1

| Sample No. | impurity species | formulated concentration | pH value | conductivity | visibility |
|---|---|---|---|---|---|
| $W_1$ | A | 500 mg/l | 6.5 | 0.98 μs/cm | <5 cm |
| $W_2$ | B | 200 mg/l | 6.5 | 0.98 μs/cm | <5 cm |
| $W_3$ | C | SS 1000 mg/l | 6.4 | 0.98 μs/cm | <5 cm |
| $W_4$ | A | 500 mg/l | 6.5 | 800 μs/cm | <5 cm |
| $W_5$ | B | 200 mg/l | 6.5 | 800 μs/cm | <5 cm |
| $W_6$ | C | SS 1000 mg/l | 6.4 | 800 μs/cm | <5 cm |
| $W_7$ | A | 500 mg/l | 6.5 | 254 μs/cm | <5 cm |
| $W_8$ | B | 200 mg/l | 6.4 | 254 μs/cm | <5 cm |
| $W_9$ | C | SS 1000 mg/l | 6.5 | 254 μs/cm | <5 cm |
| $W_{10}$ | A | 250 mg/l | | | |
| | C | SS 1000 mg/l | 6.7 | 2000 μs/cm | <5 cm |
| $W_{11}$ | A | 500 mg/l | 0.1 | 208 μs/cm | <5 cm |
| $W_{12}$ | B | 200 mg/l | 0.1 | 208 μs/cm | <5 cm |
| $W_{13}$ | C | SS 1000 mg/l | 0.1 | 208 μs/cm | <5 cm |
| $W_{14}$ | A | 500 mg/l | 6.5 | 800 μs/cm | <5 cm |
| $W_{15}$ | B | 200 mg/l | 6.5 | 800 μs/cm | <5 cm |
| $W_{16}$ | C | SS 1000 mg/l | 6.5 | 800 μs/cm | <5 cm |
| $W_{17}$ | A | 500 mg/l | 13.4 | 238 μs/cm | <5 cm |
| $W_{18}$ | B | 200 mg/l | 13.4 | 238 μs/cm | <5 cm |
| $W_{19}$ | C | SS 1000 mg/l | 13.4 | 238 μs/cm | <5 cm |
| $W_{20}$ | A | 500 mg/l | 5.4 | 0.98 μs/cm | <5 cm |
| $W_{21}$ | B | 200 mg/l | 5.4 | 0.98 μs/cm | <5 cm |
| $W_{22}$ | C | SS 1000 mg/l | 5.4 | 0.98 μs/cm | <5 cm |
| $W_{23}$ | A | 500 mg/l | 7.6 | 100 μs/cm | <5 cm |
| $W_{24}$ | B | 200 mg/l | 7.6 | 100 μs/cm | <5 cm |

TABLE 1-continued

| Sample No. | impurity species | formulated concentration | pH value | conductivity | visibility |
|---|---|---|---|---|---|
| $W_{25}$ | C | SS 1000 mg/l | 7.6 | 100 μs/cm | <5 cm |
| $W_{26}$ | A | 500 mg/l | 7.3 | 254 μs/cm | <5 cm |
| $W_{27}$ | B | 200 mg/l | 7.3 | 254 μs/cm | <5 cm |
| $W_{28}$ | C | SS 1000 mg/l | 7.3 | 254 μs/cm | <5 cm |

Experimental Instrument
1. basic instrument
1) power supply: DC, 0~500 V of adjustable voltage, 30 ampere of maximum current output
2) pump and motor: 1 cc~100 cc per minute of adjustable pumping amount
3) reaction tank installation: arranging the electrode plates and the conductive plates in a parallel way, placing the conductive plates between the electrode plates in a equally spaced way and in parallel to the ground, connecting the anode of the power supply to the upper electrode plate and the cathode of the power supply to the lower electrode plate (or connecting the anode to the lower electrode plate and the cathode to the lower electrode plate), enclosing the tank with a insulating closed vessel, and designed to have the water body flow upwardly to form an S-shaped flow path
4) the dimensions of the electrode plates and the conductive plates: 13 cm in length, 3 cm in width, 0.2 cm in thick
5) air compressor: pressure up to 110 kg/cm$^2$
2. Reaction Tank Types

TABLE 2

| Tank No. | electrode plate material | electrode plate piece number | conductive plate material | conductive plate piece number | distance between two electrodes (cm) |
|---|---|---|---|---|---|
| $R_0$ | Fe | 10 | — | — | 0.5 |
| $R_1$ | Fe | 10 | — | — | 1.0 |
| $R_2$ | Fe | 2 | Fe | 8 | 10.6 |
| $R_3$ | Fe | 2 | Fe | 80 | 97 |
| $R_4$ | Al | 2 | Al | 8 | 10.6 |
| $R_5$ | Fe | 2 | Fe | 16 | 20.2 |
| $R_6$ | Ag | 2 | Ag | 8 | 10.6 |
| $R_7$ | Cu | 2 | Cu | 8 | 10.6 |
| $R_8$ | Au | 2 | Au | 8 | 10.6 |
| $R_9$ | Zn | 2 | Zn | 8 | 10.6 |
| $R_{10}$ | Cd | 2 | Cd | 8 | 10.6 |
| $R_{11}$ | Pt | 2 | Pt | 8 | 10.6 |
| $R_{12}$ | Sn | 2 | Sn | 8 | 10.6 |
| $R_{13}$ | Cr | 2 | Cr | 8 | 10.6 |
| $R_{14}$ | Pb | 2 | Pb | 8 | 10.6 |
| $R_{15}$ | Sb | 2 | Sb | 8 | 10.6 |
| $R_{16}$ | Ti | 2 | Ti | 8 | 10.6 |
| $R_{17}$ | Mn | 2 | Mn | 8 | 10.6 |

| Tank No. | electrode plate material | electrode plate piece number | conductive plates material | conductive plates piece number | conductive plates material | conductive plates piece number | conductive plates material | conductive plates piece number | distance between two electrodes (cm) |
|---|---|---|---|---|---|---|---|---|---|
| R18 | azurite | 2 | azurite | 8 | — | — | — | — | 10.6 |
| R19 | chalco-pyrite | 2 | chalco-pyrite | 8 | — | — | — | — | 10.6 |
| R20 | stainless | 2 | stainless | 8 | — | — | — | — | 10.6 |
| R21 | alferon | 2 | alferon | 8 | — | — | — | — | 10.6 |
| R22 | chromel | 2 | chromel | 8 | — | — | — | — | 10.6 |
| R23 | graphite | 2 | graphite | 8 | — | — | — | — | 10.6 |
| R24 | Fe | 2 | Al | 8 | — | — | — | — | 10.6 |
| R25 | Al | 2 | Fe | 4 | Zn | 4 | — | — | 10.6 |
| R26 | Fe | 2 | Al | 3 | Zn | 3 | Cu | 2 | 10.6 |
| R27 | stainless | 2 | graphite | 2 | azurite | 3 | chalco-pyrite | 3 | 10.6 |
| R28 | Fe | 2 | Fe | 8 × 1 | — | — | — | — | 10.6 |
| R29 | Fe | 10 | Fe | 8 × 9 | — | — | — | — | 10.6 |
| R30 | Fe | 40 | Fe | 1 × 39 | — | — | — | — | 10.6 |
| R31 | Fe | 81 | Fe | 0 | — | — | — | — | 10.6 |
| R32 | Fe | 2 | Fe | 4 × 1 | — | — | — | — | 10.6 |
| R33 | Fe | 2 | Fe | 20 × 1 | — | — | — | — | 10.6 |
| R34 | Fe | 2 | Fe | 40 × 1 | — | — | — | — | 10.6 |
| R35 | Fe | 2 | Fe | 80 × 1 | — | — | — | — | 10.6 |

Remarks:
1) azurite: 95% Cu, 5% Zn
2) chalcopyrite: 70% Cu, 30% Zn
3) stainless: 74% Fe, 18% Cr, 8% Ni
4) alferon: 82.25% Fe, 14.25% Cr, 3.5% Al
5) chromel: 50% Fe, 30% Ni, 20% Cr
6) sectional area of the flow path of the Ro reaction tank: 1.5 cm$^2$
7) section area of flow paths of the other reaction tanks: 3 cm$^2$ Experimental Data and Result
1. Experiments on the intensities of electric field

TABLE 3

| Run No. | Reaction tank | water specimen | electric field intensity | run step | treating effect (visibility) |
|---|---|---|---|---|---|
| 1 | $R_1$ | $W_1$ | 1000 V/cm | A | >30 cm |
| 2 | $R_1$ | $W_2$ | 1000 V/cm | A | >30 cm |
| 3 | $R_1$ | $W_3$ | 1000 V/cm | A | >30 cm |
| 4 | $R_2$ | $W_4$ | 15 V/cm | A | >30 cm |
| 5 | $R_2$ | $W_5$ | 15 V/cm | A | >30 cm |
| 6 | $R_2$ | $W_6$ | 15 V/cm | A | >30 cm |
| 7 | $R_3$ | $W_7$ | 0.1 V/cm | A | >30 cm |
| 8 | $R_3$ | $W_8$ | 0.1 V/cm | A | >30 cm |
| 9 | $R_3$ | $W_9$ | 0.1 V/cm | A | >30 cm |

Remarks:
1) water temperature: 25° C.
2) flow rate of water body: F=4.32 cm/sec
3) water pressure<2 kg/cm$^2$ From the above table, it can be found that the treatments on the specimens under the electric field having intensities ranged from 0.1 V/cm to 1000 V/cm achieve satisfactory effects.

2. Experiments on the flow rates of water body

TABLE 4

| Run No. | Reaction tank | water specimen | flow rate | run step | treating effect (visibility) |
|---|---|---|---|---|---|
| 10 | $R_2$ | $W_4$ | 0 | B | >30 cm |
| 11 | $R_2$ | $W_5$ | 0 | B | >30 cm |
| 12 | $R_2$ | $W_6$ | 0 | B | >30 cm |
| 13 | $R_2$ | $W_4$ | 4.32 cm/sec | A | >30 cm |
| 14 | $R_2$ | $W_5$ | 4.32 cm/sec | A | >30 cm |
| 15 | $R_2$ | $W_6$ | 4.32 cm/sec | A | >30 cm |
| 16 | $R_3$ | $W_4$ | 3.89 cm/sec | A | >30 cm |
| 17 | $R_3$ | $W_5$ | 3.89 cm/sec | A | >30 cm |
| 18 | $R_3$ | $W_6$ | 3.89 cm/sec | A | >30 cm |

Remarks:
1) water temperature: 25° C.
2) electric field intensity: 15 V/cm
3) water pressure<2 kg/cm$^2$ From the above table, it can be found that the treatments on the specimens having flow rates ranged from 0 to 3.8 m/sec achieve satisfactory effects.

3. Experiments on the conductivities of water body

TABLE 5

| Run No. | Reaction tank | water specimen | conductivity | run step | treating effect (visibility) |
|---|---|---|---|---|---|
| 19 | $R_1$ | $W_{20}$ | 0.98 µs/cm | A | >30 cm |
| 20 | $R_1$ | $W_{21}$ | 0.98 µs/cm | A | >30 cm |
| 21 | $R_1$ | $W_{22}$ | 0.98 µs/cm | A | >30 cm |
| 22 | $R_2$ | $W_{23}$ | 100 µs/cm | A | >30 cm |
| 23 | $R_2$ | $W_{24}$ | 100 µs/cm | A | >30 cm |
| 24 | $R_2$ | $W_{25}$ | 100 µs/cm | A | >30 cm |
| 25 | $R_5$ | $W_{26}$ | 254 ms/cm | A | >30 cm |
| 26 | $R_5$ | $W_{27}$ | 254 ms/cm | A | >30 cm |
| 27 | $R_5$ | $W_{28}$ | 254 ms/cm | A | >30 cm |

Remarks:
1) water temperature: 25° C.
2) flow rate of water body: 4.32 cm/sec
3) electric field intensity: Runs 19, 20 and 21: 250 V/cm
   Runs 22, 23 and 24: 15 V/cm
   Runs 25, 26 and 27: 1 V/cm
4) water pressure<2 kg/cm$^2$ From the above table, it can be found that the treatments on the specimens having conductivities ranged from 0.98 µs/cm to 254 ms/cm achieve satisfactory effects.

4. Experiments on the pH values of water body

TABLE 6

| Run No. | Reaction tank | water specimen | conductivity | run step | treating effect (visibility) |
|---|---|---|---|---|---|
| 28 | $R_2$ | $W_{11}$ | 0 | A | >30 cm |
| 29 | $R_2$ | $W_{12}$ | 0 | A | >30 cm |
| 30 | $R_2$ | $W_{13}$ | 0 | A | >30 cm |
| 31 | $R_2$ | $W_{14}$ | 6.5 | A | >30 cm |
| 32 | $R_2$ | $W_{15}$ | 6.5 | A | >30 cm |
| 33 | $R_2$ | $W_{16}$ | 6.5 | A | >30 cm |
| 34 | $R_4$ | $W_{17}$ | 14 | A | >30 cm |
| 35 | $R_4$ | $W_{18}$ | 14 | A | >30 cm |
| 36 | $R_4$ | $W_{19}$ | 14 | A | >30 cm |

Remarks:
1) water temperature 25° C.
2) rate of water body: 4.32 cm/sec
3) electric field intensity: 15 V/cm
4) water pressure<2 kg/cm$^2$ From the above table, it can be found that the treatments on the specimens having pH values ranged from 0 to 14 achieve satisfactory effects.

5. Experiments on the temperatures of water body

TABLE 7

| Run No. | Reaction tank | water specimen | water temperature | run step | treating effect (visibility) |
|---|---|---|---|---|---|
| 37 | $R_2$ | $W_4$ | 0° C. | A | >30 cm |
| 38 | $R_2$ | $W_5$ | 0° C. | A | >30 cm |
| 39 | $R_2$ | $W_6$ | 0° C. | A | >30 cm |
| 40 | $R_2$ | $W_4$ | 25° C. | A | >30 cm |
| 41 | $R_2$ | $W_5$ | 25° C. | A | >30 cm |
| 42 | $R_2$ | $W_6$ | 25° C. | A | >30 cm |
| 43 | $R_2$ | $W_4$ | 100° C. | A | >30 cm |
| 44 | $R_2$ | $W_5$ | 100° C. | A | >30 cm |
| 45 | $R_2$ | $W_6$ | 100° C. | A | >30 cm |

Remarks:
1) flow rate of water body: F=4.32 cm/sec
2) electric field intensity: E=15 V/cm
3) water pressure<2 kg/cm$^2$ From the above table, it can be found that the treatments on the specimens having temperatures ranged from 0° C. to 100° C. achieve satisfactory effects. In other words, the water body can be well treated as long as it is in a liquid phase.

6. Experiments on the pressures of water body

TABLE 8

| Run No. | Reaction tank | water specimen | water temperature | run step | treating effect (visibility) |
|---|---|---|---|---|---|
| 46 | $R_2$ | $W_4$ | 2 kg/cm$^2$ | A | >30 cm |
| 47 | $R_2$ | $W_5$ | 2 kg/cm$^2$ | A | >30 cm |
| 48 | $R_2$ | $W_6$ | 2 kg/cm$^2$ | A | >30 cm |
| 49 | $R_2$ | $W_4$ | 10 kg/cm$^2$ | C | >30 cm |
| 50 | $R_2$ | $W_5$ | 10 kg/cm$^2$ | C | >30 cm |
| 51 | $R_2$ | $W_6$ | 10 kg/cm$^2$ | C | >30 cm |
| 52 | $R_2$ | $W_4$ | 50 kg/cm$^2$ | C | >30 cm |
| 53 | $R_2$ | $W_5$ | 50 kg/cm$^2$ | C | >30 cm |
| 54 | $R_2$ | $W_6$ | 50 kg/cm$^2$ | C | >30 cm |

Remarks:
1) water temperature: 25° C.
2) electric field intensity: E=15 V/cm 3) flow rate of water body: 6 cm/sec (Runs 46, 47 and 48) the others (Runs 49–54): 0 cm/sec From Runs 1–45 which is under a normal water pressure and the above table, it can be found that the treatments on the specimens having pressures ranged from normal value to 50 kg/cm$^2$ achieve satisfactory effects. In other words, the water body can be well treated as long as it is in a liquid phase.

7. Experiments on the resistivities of the materials forming the electrode plates and conductive plates A. metal elements:

TABLE 9

| Run No. | Reaction tank | water specimen | materials forming the electrode plates and conductive plates | resistivity ($\mu\Omega \cdot$ cm) | treating effect (visibility) |
|---|---|---|---|---|---|
| 55 | $R_6$ | $W_4$ | Ag | 1.59, 20° C. | >30 cm |
| 56 | $R_7$ | $W_4$ | Cu | 1.673, 20° C. | >30 cm |
| 57 | $R_8$ | $W_4$ | Au | 2.49, 0° C. | >30 cm |
| 58 | $R_4$ | $W_4$ | Al | 2.655, 20° C. | >30 cm |
| 59 | $R_9$ | $W_4$ | Zn | 5.916, 20° C. | >30 cm |
| 60 | $R_{10}$ | $W_4$ | Cd | 6.83, 0° C. | >30 cm |
| 61 | $R_2$ | $W_4$ | Fe | 9.71, 20° C. | >30 cm |
| 62 | $R_{11}$ | $W_4$ | Pt | 9.83, 0° C. | >30 cm |
| 63 | $R_{12}$ | $W_5$ | Sn | 11.5, 20° C. | >30 cm |
| 64 | $R_{13}$ | $W_4$ | Cr | 13.0, 28° C. | >30 cm |
| 65 | $R_{14}$ | $W_4$ | Pb | 20.65, 20° C. | >30 cm |
| 66 | $R_{15}$ | $W_4$ | Sb | 39.0, 0° C. | >30 cm |
| 67 | $R_{16}$ | $W_4$ | Ti | 80, 0° C. | >30 cm |
| 68 | $R_{17}$ | $W_4$ | Mn | 185, 20° C. | >30 cm |

Remarks:

1) rate of water body: F=4.32 cm/sec  4) water temperature: 25° C.

2) electric field intensity: E=15 V/cm  5) run step: A 3) water pressure<2 kg/cm$^2$ From the above table, it can be found that the utilization of electrode plates and conductive plates made of materials having resistivities ranged from 1.59 $\mu\Omega$cm to 185 $\mu\Omega$cm achieve satisfactory effects.

B. alloys

TABLE 10

| Run No. | Reaction tank | water specimen | materials forming the electrode plates and conductive plates | resistivity ($\mu\Omega \cdot$ cm) | treating effect (visibility) |
|---|---|---|---|---|---|
| 69 | $R_{18}$ | $W_4$ | azurite | 10 | >30 cm |
| 70 | $R_{19}$ | $W_4$ | chalcopyrite | 11 | >30 cm |
| 71 | $R_{20}$ | $W_4$ | stainless | 70 | >30 cm |
| 72 | $R_{21}$ | $W_4$ | alferon | 112 | >30 cm |
| 73 | $R_{22}$ | $W_4$ | chromel | 112 | >30 cm |

Remarks:

1) flow rate of water body: F=4.32 cm/sec 2) electric field intensity: E=15 V/cm 3) water pressure<2 kg/cm$^2$ 4) water temperature: 25° C.

5) run step: A

From the above table, it can be found that the treatment effects on water body are still satisfactory when the electrode plates and the conductive plates are made of alloys consisting of two or more metals.

C. non-metal elements

TABLE 11

| Run No. | Reaction tank | water specimen | materials forming the electrode plates and conductive plates | resistivity ($\mu\Omega \cdot$ cm) | treating effect (visibility) |
|---|---|---|---|---|---|
| 74 | $R_{23}$ | $W_{10}$ | graphite | 1300, 0° C. | >30 cm |

Remarks:

1) flow rate of water body: F=4.32 cm/sec 2) electric field intensity: E=15 V/cm 3) water pressure<2 kg/cm$^2$ 4) water temperature: 25° C.

5) run step: A

From the above table, it can be found that the treatment effects on water body are very excellent when the electrode plates and the conductive plates are made of non-metal elements. What is especially worth mentioning is the excellent treatment effect even when the resistivity is up to 1300 $\mu\Omega$cm.

D. blended material

TABLE 12

| Run No. | Reaction tank | water specimen | materials forming the electrode plates and conductive plates | resistivity ($\mu\Omega \cdot$ cm) | treating effect (visibility) |
|---|---|---|---|---|---|
| 75 | $R_{24}$ | $W_4$ | Fe, Al | 11 | >30 cm |
| 76 | $R_{25}$ | $W_4$ | Al, Fe, Zn | 70 | >30 cm |
| 77 | $R_{26}$ | $W_4$ | Fe, Al, Zn, Cu | 112 | >30 cm |
| 78 | $R_{27}$ | $W_4$ | stainless, graphite, azurite, chalcopyrite | 112 | >30 cm |

Remarks:

1) flow rate of water body: F=4.32 cm/sec 2) electric field intensity: E=15 V/cm 3) water pressure<2 kg/cm$^2$ 4) water temperature: 25° C.

5) run step: A

From the above table, it can be found that the treatment effects on water body are still satisfactory when the electrode plates and the conductive plates are made of blended materials consisting of two or more metals.

8. Experiments on multiple electrode plates and multiple conductive plates

The inventors set up a reaction tank with a plurality of electrode plates bearing alternative positive and negative charges, and incorporate various numbers of conductive plates between electrode plates in order to investigate the effect of the multiple electrode plates and multiple conductive plates on the water treatment effect. The experimental results are summarized as below.

TABLE 13

| Run No. | Reaction tank | water specimen | electric field intensity | run step | treating effect (visibility) |
|---|---|---|---|---|---|
| 79 | $R_{28}$ | $W_4$ | 15 V/cm | A | >30 cm |
| 80 | $R_{29}$ | $W_4$ | 15 V/cm | A | >30 cm |
| 81 | $R_{30}$ | $W_{23}$ | 200 V/cm | A | >30 cm |
| 82 | $R_{31}$ | $W_{23}$ | 200 V/cm | A | >30 cm |
| 83 | $R_{32}$ | $W_4$ | 15 V/cm | A | >30 cm |
| 84 | $R_{33}$ | $W_{10}$ | 15 V/cm | A | >30 cm |
| 85 | $R_{34}$ | $W_7$ | 1 V/cm | A | >30 cm |
| 86 | $R_{35}$ | $W_7$ | 1 V/cm | A | >30 cm |

Remarks:
1) water pressure $F<2$ kg/cm$^2$
1) water temperature: 25° C.
2) rate of water body: 4.32 cm/sec From the above table, when various water bodies are treated, the good effect on the water treatment can be achieved under the proper control of the electric field intensity by using two or more sequentially aligned electrode plates and installing 0 to several conductive plates between the two electrodes.

Embodiment 3

The present embodiment illustrates the treatments on dyeing waste water (A) and (B), and pulp (C) and (D) The treatment conditions and the properties of the water body before and after it is treated are listed in Table 14.

Table 15 shows the energy-consumption state of an embodied apparatus installed in a restaurant located in National Jiao-Tong University for treating the kitchen waste water.

It is shown in the table that the electric energy consumed for treating one ton of waste water is less than 0.15 degree, which is economical than any prior method.

TABLE 15

| Example | date yr/month/day | electricity degree shown on meter | | | electricity degree shown on meter | | | average electricity consumption for treating water (degree/ton) |
|---|---|---|---|---|---|---|---|---|
| | | initial | final | net | initial | final | net | |
| B | 1994/3/3 | 17.8 | 18.3 | 0.5 | 28.5 | 32 | 3.5 | 0.143 |
| F | 1994/3/7 | 18.5 | 18.75 | 0.25 | 34 | 37.5 | 3.5 | 0.072 |
| G | 1994/3/8 | 18.9 | 19.4 | 0.5 | 40 | 49 | 9 | 0.056 |
| H | 1994/3/10 | 19.9 | 20.5 | 0.35 | 51 | 54 | 3 | 0.117 |

Remarks:
The operation conditions are listed as follows:
voltage 170 V
electric field intensity: 8.5 V/cm
electrode material: titanium plate covered with platinum
number of conductive plates: 30
flow path: 18 m

TABLE 14

| water species | specimen | visibility (cm) | temperature (°C.) | pH | conductivity | period of polarity-exchange cycle (min) | SS (mg/l) | CDO (mg/l) | voltage (V) | current density (A/in$^2$) | material forming conductive plates |
|---|---|---|---|---|---|---|---|---|---|---|---|
| dyeing waste water (A) | untreated | 3.1 | 21 | 6.2 | 0.5 | | 170 | 945 | | | |
| | treat 1 | 30 | 23 | 8.3 | 0.71 | 5 | 5 | 82 | 150 | 1.20 | Al |
| | treat 2 | 30 | 24 | 8.5 | 0.71 | 10 | 5 | 120 | 200 | 1.67 | Fe |
| dyeing waste water (B) | untreated | 4.9 | 22 | 11 | 4.90 | | 102 | 885 | | | |
| | treat 1 | 30 | 24 | 7.5 | 4.90 | 30 | 10 | 148 | 50 | 1.27 | Al |
| | treat 2 | 30 | 24 | 8 | 4.90 | 80 | 10 | 98 | 130 | 17 | Fe |
| pulp (C) | untreated | 5 | 20 | 5.8 | 0.7 | | 120 | 1010 | | | |
| | treat 1 | 30 | 22 | 8.0 | 0.7 | 90 | 2 | 90 | 200 | 6 | Al |
| | treat 2 | 30 | 22 | 7.6 | 0.7 | 120 | 2 | 120 | 50 | 5.5 | Fe |
| pulp (D) | untreated | 8.5 | 20 | 4.5 | 9.0 | | 85 | 1500 | | | |
| | treat 1 | 30 | 22 | 7.5 | 9.0 | 90 | 2 | 180 | 50 | 5.5 | Al |
| | treat 2 | 30 | 22 | 8.2 | 9.0 | 60 | 2 | 120 | 100 | 15 | Fe | treating time on water body: 1 minute electrode: stainless #304
treating pressure: 200 cm · H$_2$O area of conductive plates: 120 in$^2$

Embodiment 4

The present embodiment demonstrates that the present method can economize electricity.

The operation of electric energy applied in the present invention include:
1) providing power for the pressurizing bump for pumping water body, and
2) providing bias for electrodes for the induction of the impurity polarization.

Owing to the electric energy required by the induction of the impurity polarization so that a considerable amount of energy can be economized during waste water treatment.

material for conductive plates: iron

| | pH value | conductivity |
|---|---|---|
| Example E | 6.5 | 1,831 μS/cm |
| Example F | 6.8 | 1,419 μS/cm |
| Example G | 6.4 | 1,350 μS/cm |
| Example H | 6.9 | 1,178 μS/cm | visibility of untreated water: <6 cm (Examples E~H)
visibility of treated water: >30 cm (Examples E~H)

Embodiment 5

The present embodiment illustrates the operation result of the present apparatus used by the Jin-Lun Automobile Industry Co., Ltd.

The Jin-Lun Automobile Industry Co., Ltd. is a mechanical product processing factory. The waste water generated in the factory is a mixed waste water containing diesel oil, dressing oil, antirust oil, iron ion and kitchen waste water. The properties of water untreated or treated according to the present invention are listed in Table 16 (treating time: 1 minute).

TABLE 16

| Examples | inspecting report | item | untreated water | treated water | impurity-removing |
|---|---|---|---|---|---|
| I | 93G15B062 EV82B1427 | suspensive solid (mg/l) | 34600 | <4 | 99.99% |
| | | COD (mg/l) | 85300 | 29.7 | 99.97% |
| | | iron (mg/l) | 1700 | 1.38 | 99.92% |
| | | total fat (mg/l) | 6593 | 8.7 | 99.87% |
| J | 93G15B062 EV82B1427 | suspensive solid (mg/l) | 7450 | <4 | 99.95% |
| | | COD (mg/l) | 39800 | 22.3 | 99.94% |
| | | iron (mg/l) | 1690 | 1.32 | 99.92% |

Remarks:
1. The operation conditions are listed as follows:
voltage: 170 V
electric field intensity: 8.5 V/cm
electrode material: titanium plate covered with platinum
number of conductive plates: 30
flow path: 18 m
material for conductive plates: iron
treating capacity: 2 $m^3$/hr

| | pH value | conductivity |
|---|---|---|
| Example I | 6.8 | 804 µS/cm |
| Example J | 6.6 | 766 µS/cm |

2. The sampling and inspecting organization is an inspecting company approved by the Environment Protection Agency of R. O. C., and the company name and the approval number are: Ching Chun Environmental Co., Ltd., No. (E)-022.

It is shown from the data in Table 16 that the present apparatus makes the impurity removing percentage of the waste water up to more than 99% in a short time. Furthermore, it can directly treat the water body in which the COD value is up to more than 80,000 and the suspensive solid content is up to 30,000. These results cannot be obtained by the prior art.

After long-term inspection, the average electric energy consumption for treating waste water in this company is 01.2 kwh/ton waste water. The specific energy-consumption (Es) can be calculated according to the following equation:

$$\begin{aligned} Es &= \text{input electric energy}/COD \text{ removing amount} \\ &= (0.2 \text{ kwh/ton})/((85300 - 29.7)\text{mg/L}) \\ &= (0.2 \text{ kwh} \times 10^{-3} \text{ L})/(85270.3 \text{ mg/L} \times 10^{-6} \text{ kg/mg}) \\ &= 0.023 \text{ kwh/kg} - COD \end{aligned}$$

The specific energy consumption according to the present invention is 1% to 0.1% of those of the continuous electrolyzed colloid floating-and-removing methods proposed by aforementioned Profs. Lee and Yan.

Further, little contaminant deposition occurs in the S-shaped flow path after long-term use which can be evidenced by that the sectional area of the S-shaped flow path is 30 cm×1 cm before use and it remains 30 cm×1 cm after use for more than one year.

In addition, no notable damage of electrode or dielectric plates has been observed. The thickness of the plates is 10 m/m before use and remains the same after use for more than one year.

Embodiment 6

The treating results of applying various electric fields to impurities by applying various bias between two electrodes are shown in Table 17. It can be found from Table 17 that when the electric field intensity is lowered to 0.5 mV/cm, the COD removing percentage is down to less that 5% and it is not practical anymore.

TABLE 17

| Example | electric field intensity | COD of treated water | COD removing percentage |
|---|---|---|---|
| K | 1.25 V/cm | 1440 mg/l | 43.75% |
| L | 1 V/cm | 1408 mg/l | 245% |
| M | 0.25 V/cm | 1456 mg/l | 43.13% |
| N | 50 mV/cm | 1586 mg/l | 38.05% |
| O | 25 mV/cm | 1880 mg/l | 26.56% |
| P | 2.5 mV/cm | 2340 mg/l | 8.59% |
| Q | 0.5 mV/cm | 2500 mg/l | 2.3% |

Remarks:
1. electric field intensity=bias/distance between the electrodes
2. distance between the electrodes: 20 cm
3. number of conductive plates: 30
4. flow path: 600 cm
5. flow rate: 10 cm/min
6. pH value: 7.66
7. untreated water COD: 2560 mg/l
8. conductivity: 175×$10^3$ µs/cm
9. waste water source: Cafeteria in National Chiao Tung University
10. material forming electrode plates: titanium plates covered with platinum
11. material forming conductive plates: iron

Embodiment 7

The present embodiment concentrates on the study on the effect of the flow rates on the treating results. It can be found from Table 18 that the COD removing percentage is up to 37.69% even when the flow rate is 3.89 m/sec. Therefore, it is concluded from Tables 4 and 5 that satisfactory results can be obtained in conditions of 10 cm/min to 3.89 m/sec of flow rate.

TABLE 18

| Example | treated water amount ($m^3$/n) | flow rate (m/sec) | COD of treated water (mg/l) | COD removing percentage |
|---|---|---|---|---|
| R | 10 | 0.92 | 72.2 | 88.89% |
| S | 15.5 | 1.44 | 102 | 84.31% |
| T | 22.7 | 2.10 | 240 | 63.08% |
| U | 31 | 2.87 | 330 | 49.23% |
| V | 42 | 3.89 | 405 | 37.69% |

Remarks:
1. flow rate=treated water amount ($m^3$)/sectional area of the S-shaped flow path 2. distance between the electrodes: 20 cm
3. number of conductive plates: 30
4. flow path: 1800 cm
5. electric field intensity: 8.5 V/cm
6. pH value: 6.2
7. untreated water COD: 650 mg/l
8. conductivity: 1935 μs/cm
9. waste water source: the restaurant in Jiao-Tong University
10. material forming electrode plates: titanium plates covered with platinum
11. material forming conductive plates: iron Embodiment 8

The present embodiment shows the effect of the present invention used for removing *coliform bacillus*.

TABLE 19

| Inspection report No. | Item | untreated water | treated water |
| --- | --- | --- | --- |
| 93124B106 | *coliform bacillus* | $2.6 \times 10^5$ MPN/100 m | < 2MPN/100 ml |
| EV82B1680 | | 1 | |

Remarks:
The operation conditions are listed as follows:
voltage: 170 V
electric field intensity: 8.5 V/cm
electrode material: titanium plate covered with platinum
number of conductive plates: 30 (material: iron)
flow path: 18 m
pH value: 6.7
conductivity: 780 μs/cm
treating capacity: 2 m³/hr Embodiment 9

The present embodiment is related to the effect of the present invention on the reduction of the BOD in the water body. Please refer to Table 20.

Because the fat, *coliform bacillus* and other organisms in water have their own BOD, the BOD in water will be reduced after the fat, *coliform bacillus* and other organisms are removed.

TABLE 20

| Inspection report No. | Item | untreated water | treated water | BOD reduction percentage |
| --- | --- | --- | --- | --- |
| EV81B0928 | BOD | 653 mg/l | 44.6 mg/l | 93.27% |

Remarks:
The operation conditions are listed as follows:
voltage: 170 V
electric field intensity: 8.5 V/cm
number of conductive plates: 30 (material: iron)
flow path: 18 m
pH value: 7.0
conductivity: 560 μs/cm
treating capacity: 2 m³/hr

What is claimed is:

1. A method for continuously treating a water body, comprising a step of using a substantially sealed processing tank, at a top and a bottom portions of which a water outlet and a water inlet are arranged respectively, and in an interior space of which three or more conductive plates substantially in parallel relation with the tank bottom and substantially in parallel relation with one another for upwardly forming a substantially closed S-shaped one-way flow path in said processing tank, wherein said conductive plates are made of a conductive material having a resistivity ranged from 1.59 μΩcm to 1300 μΩcm and at least two of said conductive plates are respectively electrically connected to a positive and a negative power source to serve as an anode and a cathode, wherein said water to be treated is introduced into said processing tank from said water inlet, flows upwardly through said S-shaped one-way flow path, and then is discharged out of said processing tank from said water outlet, and wherein a voltage is applied to said cathode and said anode to generate an electric field having an intensity ranged from 0.5 mV/cm to 1000 V/cm during the flow of said water body in said flow path, thereby polarizing and coagulating impurities in said water body for removing said coagulating impurities.

2. The method as claimed in claim 1 wherein said coagulating impurities are removed by a floating remover.

3. The method as claimed in claim 1, further comprising a step of adjusting said water body immediately after said water body flows out of said processing tank to make said coagulating impurities float upwardly.

4. The method as claimed in claim 1 wherein said conductive plates installed in said processing tank are made of the same or different material.

5. The method as claimed in one of claims 1–4 wherein a plurality pair of electrode plates are arranged in said processing tank in a way that cathodes and anodes are alternately arranged, and each of said plurality pairs of electrode plates having an identical or a different number of conductive plates mounted therebetween which are not connected with power supply.

6. The method as claimed in one of claims 1–4 wherein a flow rate of said water body in said S-shaped flow path is ranged from 0.1 m/sec to 3.89 m/sec.

7. The method as claimed in one of claims 1–4 wherein said electric field intensity is ranged from 0.1 V/cm to 1000 V/cm.

8. The method as claimed in one of claims 1–4 wherein the polarities of electrodes are exchanged per 1–60 minutes so that two surfaces of said conductive plates work evenly.

9. An apparatus for continuously treating a water body, comprising a substantially sealed processing tank at a top and a bottom portions of which a water outlet and a water inlet are arranged respectively, and in an interior space of which three or more conductive plates substantially in parallel relation with the tank bottom and substantially in parallel relation with one another for upwardly forming a substantially closed S-shaped one-way flow path in said processing tank, wherein said conductive plates are made of a conductive material having a resistivity ranged from 1.59 μΩcm to 1300 μΩcm and at least two of said conductive plates are respectively electrically connected to a positive and a negative power source to serve as an anode and a cathode.

10. The apparatus as claimed in claim 9 wherein said conductive plates installed in said processing tank are made of the same or different material.

11. The apparatus as claimed in claim 9 wherein a plurality pair of electrode plates are arranged in said processing tank in a way that cathodes and anodes are alternately arranged, and each of said plurality pairs of electrode plates having an identical or a different number of conductive plates mounted therebetween which are not connected with power supply.

12. The apparatus as claimed in claim 9 wherein a sliding way is mounted on both interior surfaces of said processing tank, and whereby said conductive plates slide into said sliding way to be secured to said processing tank.

13. The apparatus as claimed in claim 9 wherein a pressurizing pump is installed at said water inlet of said processing tank and a flow control valve is installed at said water outlet.

14. A system for continuously treating a water body, comprising:

- a pretreating device for adjusting the pH value, conductivity and added catalyst of a water body to be treated for improving the effect of the following electrochemical treatment;
- an electrochemical device connected with said pretreating device for facilitating coagulation of impurities in said water body and providing energy for said impurities for easily separating said impurities from said water body;
- a post-treating device connected with said electrochemical device for adjusting the pH value of said electrochemically treated water body and adding a coagulant and stabilizer to said electrochemical device when necessary;
- a floating remover connected to said post-treating device for separating impurities from water;
- said system being characterized in that said electrochemical device includes a substantially sealed processing tank, wherein
- at a top and a bottom portions of said processing tank, a water outlet and a water inlet are arranged respectively, and in an interior space of said processing tank, three or more conductive plates substantially in parallel relation with the tank bottom and substantially in parallel relation with one another for upwardly forming a substantially closed S-shaped one-way flow path in said processing tank, wherein said conductive plates are made of a conductive material having a resistivity ranged from 1.59 $\mu\Omega$cm to 1300 $\mu\Omega$cm and at least two of said conductive plates are respectively electrically connected to a positive and a negative power source to serve as an anode and a cathode.

* * * * *